United States Patent
Bhattacharjee et al.

(10) Patent No.: US 10,922,765 B2
(45) Date of Patent: Feb. 16, 2021

(54) SYSTEMS AND METHODS FOR GENERATING GRATUITY ANALYTICS FOR ONE OR MORE RESTAURANTS

(71) Applicant: Mastercard International Incorporated, Purchase, NY (US)

(72) Inventors: Manash Bhattacharjee, Jersey City, NJ (US); Prashanna S. Tiwaree, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1 day.

(21) Appl. No.: 16/552,944

(22) Filed: Aug. 27, 2019

(65) Prior Publication Data

US 2019/0385250 A1 Dec. 19, 2019
US 2020/0380621 A9 Dec. 3, 2020

Related U.S. Application Data

(62) Division of application No. 15/375,476, filed on Dec. 12, 2016, now Pat. No. 10,430,900.

(51) Int. Cl.
*G06Q 50/12* (2012.01)
*G06Q 30/02* (2012.01)
*G06Q 10/06* (2012.01)

(52) U.S. Cl.
CPC ......... *G06Q 50/12* (2013.01); *G06Q 10/0639* (2013.01); *G06Q 30/0202* (2013.01)

(58) Field of Classification Search
CPC .... G06Q 30/0214; G06Q 40/10; G06Q 50/12; G06Q 10/105; G06Q 30/06
See application file for complete search history.

(56) References Cited

U.S. PATENT DOCUMENTS 7,398,238 B1 * 7/2008 Calce ................. G06Q 40/02
705/35
2008/0065396 A1 * 3/2008 Marshall ............ G06Q 10/10
705/16

(Continued)

OTHER PUBLICATIONS

S. R. Ahmed, "Applications of data mining in retail business," International Conference on Information Technology: Coding and Computing, 2004. Proceedings. ITCC 2004., Las Vegas, NV, USA, 2004, pp. 455-459 vol. 2, doi: 10.1109/ITCC.2004.1286695. (Year: 2004).*

(Continued)

*Primary Examiner* — Ashford S Hayles
(74) *Attorney, Agent, or Firm* — Armstrong Teasdale LLP

(57) ABSTRACT

A gratuity analytics computing device for generating gratuity analytics for one or more restaurants is provided. The gratuity analytics computing device includes a memory in communication with a processor. The processor programmed to receive a date range from a client computing device. The processor is further configured to receive transaction data for transactions occurring within the date range at a restaurant. The transaction data including a manager identifier, a time stamp, and an employee identifier associated with the transactions, the transaction data including authorization messages and clearing messages. The processor is further configured to match a plurality of authorization messages with a respective plurality of clearing messages. The processor is further configured to calculate tip data for the restaurant based on the plurality of matched messages, generate gratuity analytics for the restaurant over the date range based on the tip data, and display on a user interface of the client computing device the gratuity analytics.

15 Claims, 10 Drawing Sheets

(56) References Cited

U.S. PATENT DOCUMENTS

| | | | |
|---|---|---|---|
| 2010/0257013 A1* | 10/2010 | Beauregard | G06Q 10/02 705/7.13 |
| 2012/0323626 A1* | 12/2012 | Beauregard | G06Q 10/06311 705/7.18 |
| 2013/0246146 A1* | 9/2013 | Fischer | G06Q 20/384 705/14.23 |
| 2013/0246216 A1 | 9/2013 | Chau et al. | |
| 2014/0164151 A1* | 6/2014 | Hockley | G06Q 30/0283 705/15 |
| 2014/0337099 A1* | 11/2014 | Ignacio | G06Q 30/016 705/7.32 |
| 2014/0365322 A1* | 12/2014 | Phillips | G06Q 20/349 705/16 |
| 2015/0170227 A1* | 6/2015 | Kates | G06Q 30/0282 705/347 |
| 2015/0193745 A1* | 7/2015 | Handwerger | G06Q 20/20 705/39 |
| 2015/0302388 A1* | 10/2015 | Seidman | G06Q 30/0631 705/26.7 |
| 2015/0310403 A1* | 10/2015 | Chen | G06O 20/102 705/40 |
| 2016/0055493 A1 | 2/2016 | Chau et al. | |
| 2016/0055508 A1 | 2/2016 | Chau et al. | |
| 2016/0055600 A1 | 2/2016 | Chau et al. | |
| 2016/0071122 A1 | 3/2016 | Chau et al. | |
| 2016/0078389 A1* | 3/2016 | Kim | G06Q 50/12 705/7.42 |
| 2016/0267581 A1* | 9/2016 | Huang | G06Q 40/00 |
| 2016/0350769 A1 | 12/2016 | Venkatesh et al. | |
| 2017/0032385 A1* | 2/2017 | Thomas | G06Q 50/12 |
| 2017/0345065 A1* | 11/2017 | Rosch | G06Q 30/0283 |

OTHER PUBLICATIONS

Lynn M. Gratitude and gratuity: a meta-analysis of research on the service-tipping relationship. Journal of Socio-Economics. 2000; 29(2):203. doi:10.1016/S1053-5357(00)00062-7 (Year: 2000).*

S. von Solms, "An investigation into credit card information disclosure through Point of Sale purchases," 2015 Information Security for South Africa (ISSA), Johannesburg, 2015, pp. 1-8, doi: 10.1109/ISSA.2015.7335055. (Year: 2015).*

* cited by examiner

SYSTEMS AND METHODS FOR GENERATING GRATUITY ANALYTICS FOR ONE OR MORE RESTAURANTS

CROSS REFERENCE TO RELATED APPLICATIONS

This application is a divisional application of U.S. patent application Ser. No. 15/375,476, filed Dec. 12, 2016, entitled "SYSTEMS AND METHODS FOR GENERATING GRATUITY ANALYTICS FOR ONE OR MORE RESTAURANTS", the disclosure of which is hereby incorporated herein by reference in its entirety.

BACKGROUND

The present application relates generally to a technology that may be used to assist in predicting merchant performance, and more particularly, to network-based systems and methods for analyzing and comparing businesses based on gratuity information associated with those businesses.

A gratuity, also referred to as a tip, is an amount of money tendered by a customer to a person associated with a merchant (e.g., an employee) as a way of thanking the person for a service performed. The tip is an amount of money typically paid by the customer in addition to the base price of the service or the goods purchased by the customer. Tipping is a widely practiced social custom in the United States and is usually voluntary. For example, tips are generally given for services at restaurants, golf courses, hotels, spas and salons, casinos, barber shops, as well as to taxi drivers, movers, and the like. Higher tips may be given for excellent service while smaller tips or no tips may be given for poor service. In the United States, certain types of employees, such as waiters and waitresses in a restaurant, may rely mostly on tips for income because their employers are allowed to pay them less than minimum wage with the expectation that the employee's income will be supplemented by tips.

Tipping may also provide insight into whether a community is flourishing or dwindling financially. For example, if an average tipping amount in a particular area is trending upward, it may be reasonable to assume that the community in that area is likewise trending upward financially. Tipping may also provide insight into the performance of a restaurant, group of restaurants in a geographic area, manager, and/or employee.

BRIEF DESCRIPTION

In one aspect, a gratuity analytics computing device for generating gratuity analytics for one or more restaurants, said gratuity analytics computing device comprising a memory in communication with a processor is provided. The processor is programmed to receive a date range from a client computing device, and receive transaction data for transactions occurring within the date range at a restaurant, wherein the transaction data includes a manager identifier, a time stamp, and an employee identifier associated with the transactions, and wherein the transactions include authorization messages and clearing messages. The processor is further programmed to match a plurality of authorization messages with a respective plurality of clearing messages, and calculate tip data for the restaurant based on the plurality of matched messages. The processor is further programmed to generate gratuity analytics for the restaurant over the date range based on the tip data, and display on a user interface of the client computing device the gratuity analytics.

In another aspect, a method for generating gratuity analytics for one or more restaurants is provided. The method is implemented by a gratuity analytics computing device having at least one processor in communication with a memory. The gratuity analytics computing device is in communication with a client computing device. The method includes receiving a date range from a client computing device, and receiving transaction data for transactions occurring within the date range at a restaurant, wherein the transaction data includes a manager identifier, a time stamp, and an employee identifier associated with the transactions, and wherein the transactions include authorization messages and clearing messages. The method further includes matching a plurality of authorization messages with a respective plurality of clearing messages, and calculating tip data for the restaurant based on the plurality of matched messages. The method further includes generating gratuity analytics for the restaurant over the date range based on the tip data, and displaying on a user interface of the client computing device the gratuity analytics.

In a further aspect, a computer-readable storage medium having computer-executable instructions embodied thereon is provided. When executed by a gratuity analytics computing device including at least one processor in communication with a memory, the computer-readable instructions cause the gratuity analytics computing device to receive a date range from a client computing device, and receive transaction data for transactions occurring within the date range at a restaurant, wherein the transaction data includes a manager identifier, a time stamp, and an employee identifier associated with the transactions, and wherein the transaction data includes authorization messages and clearing messages. The computer-readable instructions further cause the computing device to match a plurality of authorization messages with a respective plurality of clearing messages, calculate tip data for the restaurant based on the plurality of matched messages, generate gratuity analytics for the restaurant over the date range based on the tip data, and display on a user interface of the client computing device the gratuity analytics.

In a further aspect, a gratuity analytics computing device for generating real-time gratuity analytics for one or more restaurants is provided. The gratuity analytics computing device includes a memory in communication with a processor. The processor is programmed to receive a real-time point-of-sale (POS) data feed from a POS device associated with a restaurant. The processor is further programmed to receive, as part of the POS data feed, an authorization transaction initiated by a cardholder consumer within the restaurant, wherein the authorization transaction includes a first bill amount, an employee identifier, a manager identifier, and a table identifier. The processor is further programmed to receive, as part of the POS data feed, a clearing message matched to the authorization message wherein the clearing message includes a second bill amount, calculate a tip size based on the authorization message and the clearing message, compare the tip size to a threshold tip size range, and when the tip size falls outside of the threshold tip size range, transmit an alert to a device associated with the manager identifier.

BRIEF DESCRIPTION OF THE DRAWINGS

FIG. 1 is a schematic diagram illustrating an example multi-party payment card system for enabling payment-by-card transactions and generating aggregated merchant analytics in accordance with one embodiment of the present disclosure.

FIG. 2 is an expanded block diagram of an example embodiment of a computer system used in processing payment transactions that includes a gratuity analytics computing device in accordance with one example embodiment of the present disclosure.

FIG. 3 illustrates an example configuration of a server system such as the gratuity analytics computing device of FIG. 2.

FIG. 4 illustrates an example configuration of a client system shown in FIG. 2.

FIG. 5 is a simplified data flow diagram for generating gratuity analytics using the gratuity analytics computing device of FIG. 2.

FIG. 6 is a data flow block diagram illustrating an example process of calculating and analyzing gratuity data in accordance with an example embodiment of the present disclosure.

FIG. 7 is a simplified diagram of an example method for generating merchant analytics and displaying the analytics on a user interface using the merchant analytics computing device of FIG. 2.

FIG. 8 is a diagram of components of one or more example computing devices that may be used in the environment shown in FIG. 2.

FIGS. 9 and 10 are example screenshots of a user interface of a user computing device, including gratuity analytics generated by the gratuity analytics computing device of FIG. 2.

Figure 1:
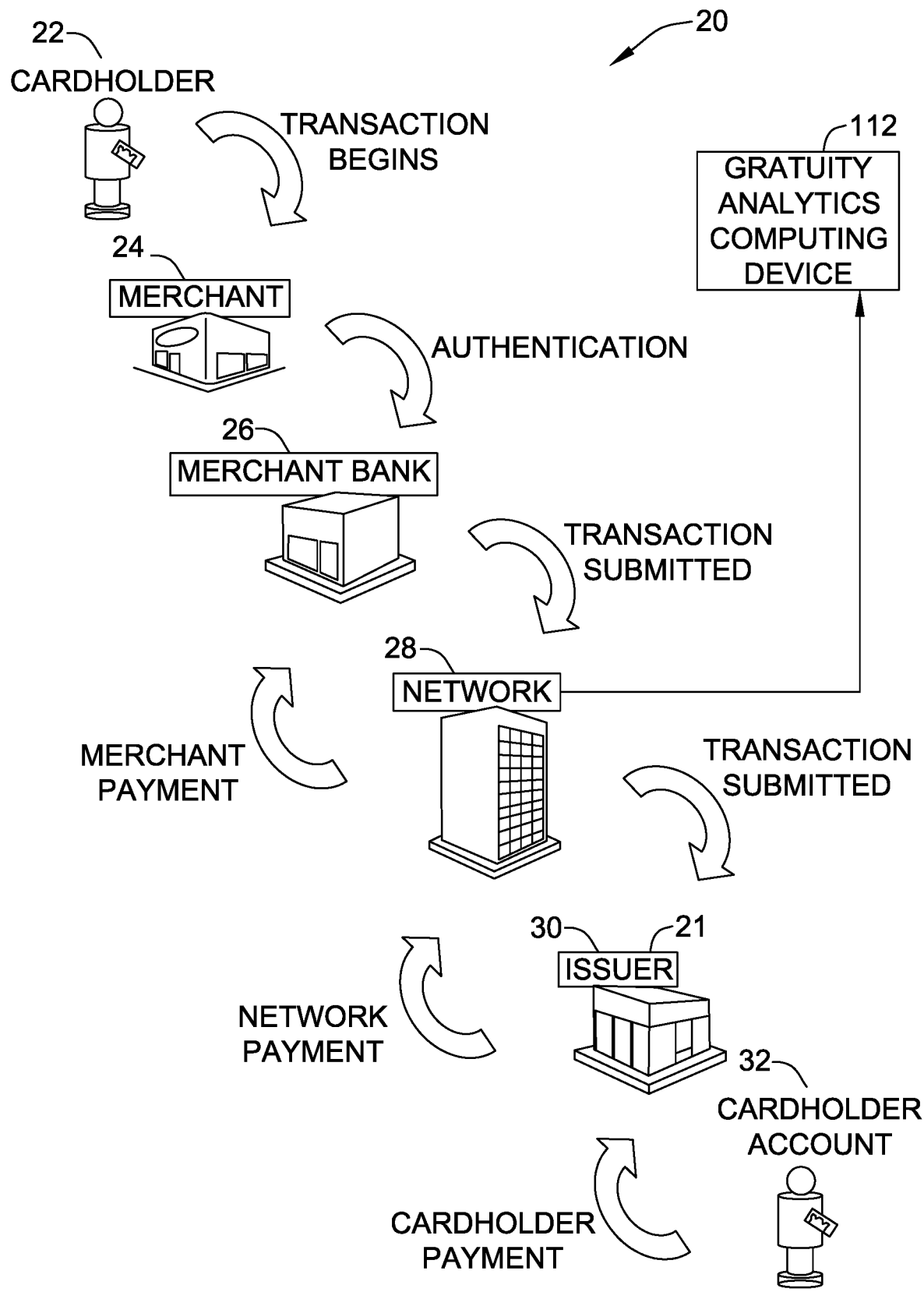
FIGS. 1-10 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION

The systems and methods described herein are directed to generating gratuity analytics for one or more restaurants. In one embodiment, the system is associated with or integral to a payment processing network including a payment processor configured to process transactions initiated by cardholders using payment cards (e.g., credit cards, debit card, prepaid cards, computing devices for storing payment account information, etc.). The payment processor collects transaction data associated with these transactions for further processing. In the example embodiment, the system includes a gratuity analytics computing device configured to process the transaction data to calculate tip data using transaction data from the payment processor, and to generate gratuity analytics based on the tip data.

As used herein, "restaurant" refers generally to any merchant serving food and/or beverages, such as fast food restaurants, "sit-down" restaurants, bars, eating establishments within other merchant locations (e.g., a café within a bookstore), etc. Although the term restaurant is used within this application, there may be other uses for this application where restaurant could be any industry where tips are received (e.g., spa, tour guide, maid service). In at least some cases, an average tip size for a particular restaurant may serve as a proxy for quality of service and/or for financial success (or lack thereof).

In the example embodiment described herein, the gratuity analytics computing device calculates a tip amount for each transaction initiated at the restaurant using authorization data and clearing data. In order to pay for a bill at a restaurant, a customer may provide their account information, for example, a payment card account associated with a payment card such as a credit card or a debit card. An employee, in this example, the waiter or waitress, may input the customer's account information by swiping (or otherwise communicating) a payment card through a point-of-sale (POS) device. The input account information may be transmitted to, for example, a payment processor, an issuing bank, and the like, to authorize payment of the bill for the meal. This initial input includes authorization data of a purchase of a meal, and typically includes the base price of the meal. Upon successful authorization of the base price by the issuing bank, a receipt may be printed out or some other form of confirmation may be generated. In this example, the customer may add a gratuity to the base price by inserting the gratuity into the receipt or confirmation. That is, after the initial authorization for the base price of the meal, the customer has the opportunity to add a gratuity. When the customer adds a gratuity and adds their signature to or otherwise authorizes the final bill, the employee will typically enter the total payment amount or the total amount may be automatically entered. Here, the total amount includes the tip plus the base price. In this example, the total amount may also be sent to the payment processor as a final amount. For example, a clearing message or clearing data including the final total may be transmitted to the payment processor.

In some embodiments, the gratuity analytics computing device is in real-time communication with the POS device. For example, the gratuity analytics computing device receives a real-time data feed from the POS device. POS integration allows real time triggers and alerts to the restaurant management about customer happiness (while the customer is still on the premises) and/or server performance. For example, the gratuity analytics computing device calculates tip percentages based on the real-time POS data feed and sends an alert to a manager device if the tip percentage for a transaction or a group transaction (e.g., entered by a specific employee) is below a predetermined threshold.

In other embodiments, the gratuity analytics computing device is not in real-time communication with a POS device. The gratuity computing device may be in communication with the payment processor and receive historical transaction data. A non-POS option will still allow the application to compare manager performance by combining manager data from restaurant systems with transaction data. For example, the non-POS option may use the historical transaction data to calculate tip percentages for a plurality of servers. This calculation may use historical data within a specified time range. For example, tip amounts may be higher at 8 PM than at 10 AM. The servers' tip data may be used to determine the performance of the manager.

The gratuity analytics computing device may receive both authorization data and clearing data from the payment processor. The gratuity analytics computing device may determine that the authorization data for the base price of the meal and the clearing data for the total amount of the meal (i.e., base price plus tip) correspond to the same transaction. For example, the gratuity analytics computing device may perform a clearing/authorization matching process that links together authorization messages with respective clearing messages based on one or more transaction identifiers included in the authorizations (e.g., messages) and the clearings (e.g., messages). Accordingly, the gratuity analytics computing device may determine that authorization data matches or corresponds to clearing data, and further compare an authorization transaction amount included in the authorization data with a clearing transaction amount included in the clearing data to determine a tip amount.

In a first embodiment, the gratuity analytics computing device performs this calculation of tip amounts on historical transaction data. The gratuity analytics computing device receives a date range from a client computing device. The client computing device may be any computing device capable of communicating over a communication link (e.g., the Internet) with the gratuity analytics computing device, including, for example, a personal computer, a server computer, a smartphone, or a tablet. The date range is input to the client computing device by a user (e.g., a user associated with a particular restaurant of a chain of restaurants) to view gratuity analytics associated with that date range. The date range may be as small as a month and may be as large as a number of years. In some embodiments, the scale of the date range affects the scale of the determined gratuity analytics. For example, if a date range of a number of years is received, the gratuity analytics computing device may generate gratuity analytics on a month-by-month scale. If a date range of a number of months (e.g., less than a year) is received, the gratuity analytics computing device may generate gratuity analytics on a month-by-month and/or a week-by-week scale.

The gratuity analytics computing device receives or retrieves transaction data for the received date range. The transaction data is received or retrieved from, for example, a payment processor and/or associated database configured to store transaction data. The transaction data is associated with a plurality of financial transactions initiated within the received date range. The transactions may be further associated (e.g., stored and linked within database) with one particular restaurant and/or with a particular chain of restaurants, which may be identified by the user of the client computing device. The gratuity analytics computing device may further retrieve transaction data that is associated with one or more competitor restaurants, as described further herein. The transaction data includes data elements such as a manager identifier, time stamp, and employee identifier associated with each of the financial transactions. The transaction data also includes the authorization transactions and clearing transactions, described above. The gratuity analytics computing device performs the above-described matching process to determine a tip amount for each matched transaction, wherein each matched transaction represents one meal or bill paid for at the restaurant.

The merchant analytics computing device may calculate an average, median, and/or other aggregated or collective tip size for the merchant, based on the plurality of individual calculated tip amounts, as described above. "Tip size" may refer to an actual numerical amount (e.g., $5.75) and/or to a percentage that the numerical tip amount represents of the total bill (e.g., 16%).

In various embodiments, the gratuity analytics computing device is configured to determine relative tip sizes according to a plurality of metrics, including time intervals (e.g., days of the week or particular time intervals within a day), manager identifier, and/or employee identifier. In other words, the gratuity analytics computing device is configured to divide the received transaction data into a plurality of subsets according to at least one of the above-identified metrics and generate gratuity analytics such as tip size for each of the subsets for comparison. The gratuity analytics computing device may generate gratuity analytics for a plurality of time intervals such that those time intervals may be compared to one another, for example, to determine a most and/or least successful time interval, or to determine a trend over a plurality of adjacent or subsequent time intervals, etc. The gratuity analytics computing device may use the manager identifier for each matched transaction to divide the transaction data according to manager. The gratuity analytics computing device may then generate gratuity analytics for each individual manager at a particular restaurant for comparison to one another, either within a particular time interval (e.g., which manager was more successful within a particular day or weekend) and/or overall. Similarly, the gratuity analytics computing device may use the employee identifier for each matched transaction to divide the transaction data according to employee (e.g., server). The gratuity analytics computing device may then generate gratuity analytics for each individual employee at a particular restaurant for comparison to one another, either within a particular time interval (e.g., which employee was more successful within a particular day or weekend) and/or overall.

The gratuity analytics computing device may further generate gratuity analytics such as average tip size for a plurality of individual restaurants within a chain, or "inter-location" gratuity analytics, for comparison of restaurant locations within the chain. This comparison is useful to, for example, a Chief Financial Officer or Chief Marketing Officer, in order to determine the best and worst performing restaurant locations within a chain.

The gratuity analytics computing device may further generate gratuity analytics for one or more competitor restaurants and/or restaurant chains. The gratuity analytics computing device may identify one or more competitors and retrieve transaction data therefor to generate the average tip size analytics described above. The gratuity analytics computing device may identify the competitor(s) by, for example, referencing a list or table. The list or table may be generated (by the gratuity analytics computing device and/or by another, separate computing device) by determining an average ticket size (e.g., average bill amount) and/or sales volume for the restaurant; determining the average ticket size and/or sales volume for a plurality of potential competitor restaurants; and identifying one or more (actual) competitor restaurants as those of the potential competitor restaurants with the most similar average ticket size and/or sales volume. The gratuity analytics computing device may therefore generate gratuity analytics (e.g., comparative average tip size or comparative average ticket size) between a restaurant/chain and its competitor(s).

In some embodiments, the gratuity analytics computing device is further configured to generate card analytics associated with the restaurant. In these embodiments, the transaction data includes a card type of each payment card used to initiate a respective one of the financial transactions represented by the transaction data. "Card type" may include an issuer identifier (e.g., Citibank), a loyalty identifier (e.g., a particular points or rewards program), and/or a level identifier (e.g., basic, corporate, business, premium, gold/silver, etc.). The gratuity analytics computing device may identify at least one commonly used card type. A commonly used card type may be defined as, for example, one or more card types with the highest usage frequency and/or one or more card types that exceed a particular usage frequency (e.g., 100 uses or 1% of the total uses). The gratuity analytics computing device may then identify the associated issuer loyalty program etc. to the restaurant, such that the restaurant may approach the corresponding issuer loyalty program etc. with one or more offers to present to cardholders having a payment card of that corresponding card type.

In another embodiment, the gratuity analytics computing device performs real-time calculation of tip amounts. In this embodiment, which is not exclusive of the above-described first embodiment, the gratuity analytics computing device receives a real-time point-of-sale (POS) data feed. This POS data feed comes from a merchant POS, for example, located within the actual restaurant. When an employee swipes a consumer's card or otherwise authorizes a transaction for a bill to be paid for, an authorization transaction (described above) is generated. The authorization transaction includes data elements such as a first bill amount, an employee identifier, a manager identifier, and a table identifier. In many cases, the employee enters a tip amount soon after, generating an associated clearing transaction for the same bill. Because the gratuity analytics computing device is receiving the real-time POS feed, the gratuity analytics computing device receives this clearing transaction, including a second bill amount equal to the first bill amount plus the tip amount, in real-time. Therefore, the gratuity analytics computing device can calculate the tip amount for the bill in real-time.

The gratuity analytics computing device compares the calculated tip amount to a threshold tip range (e.g., 10%-20%), the threshold tip range representing a typical or "acceptable" range of tip amounts. This range may be predefined, for example, by a manager of the restaurant. Alternatively, the gratuity analytics computing device may calculate and maintain the threshold tip range, for example, by calculating one standard deviation from an average tip size. When the calculated tip amount falls outside of the threshold tip range, the gratuity analytics computing device transmits an alert (e.g., a text, email, and/or app "push" notification) to a device associated with the manager identifier (e.g., the manager's phone). The alert may include the employee identifier associated with the bill and/or the table identifier associated with the bill. In this embodiment, the manager is enabled to take immediate action for a particular low or high tip amount, while the associated consumer is still likely in the restaurant. Thus, for example, the manager may be able to talk to the consumer about their particularly poor (or particularly great) experience.

The gratuity analytics computing device is further configured to facilitate the display of an interactive graphical user interface (UI). The UI may be displayed on a client computing device of a user. The UI is configured such that the user may easily view the generated gratuity analytics, for example, on a dashboard accessible through an app and/or a web browser. The UI enables the user to select the date range and/or restaurant(s) of interest, such that the gratuity analytics computing device may perform the processes described above to generate relevant analytics.

The following detailed description of the embodiments of the disclosure refers to the accompanying drawings. The same reference numbers in different drawings may identify the same or similar elements. Also, the following detailed description does not limit the claims.

Described herein are computer systems such as gratuity analytics computing devices. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "payment device," "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, and/or any other computing devices capable of providing account information. Moreover, these terms may refer to payments made directly from or using bank accounts, stored valued accounts, mobile wallets, etc., and accordingly are not limited to physical devices but rather refer generally to payment credentials. Each type of payment device can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the generation and communication (e.g., display) of aggregate gratuity analytics.

FIG. 1 is a schematic diagram illustrating an example multi-party payment card system 20 for enabling payment-by-card transactions and communicating aggregated gratuity analytics for a sector, in accordance with one embodiment of the present disclosure. FIG. 1 depicts a flow of data in a typical financial transaction through system 20, which includes a gratuity analytics computing device 112. Components of system 20 provide gratuity analytics computing device 112 with transaction data, which gratuity analytics computing device 112 processes to generate gratuity analytics and provide the analytics on a user interface.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including gratuity analytics computing device 112. In the example embodiment, interchange network 28 provides such transaction data (including merchant data associated with merchant tenants of each commercial real estate asset of each portfolio record) and additional transaction data. In alternative embodiments, any party may provide such data to gratuity analytics computing device 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, gratuity analytics computing device 112 may be used to generate and communicate aggregated gratuity analytics. Although the systems described herein are not intended to be limited to facilitate such applications, the systems are described as such for exemplary purposes.

Figure 2:
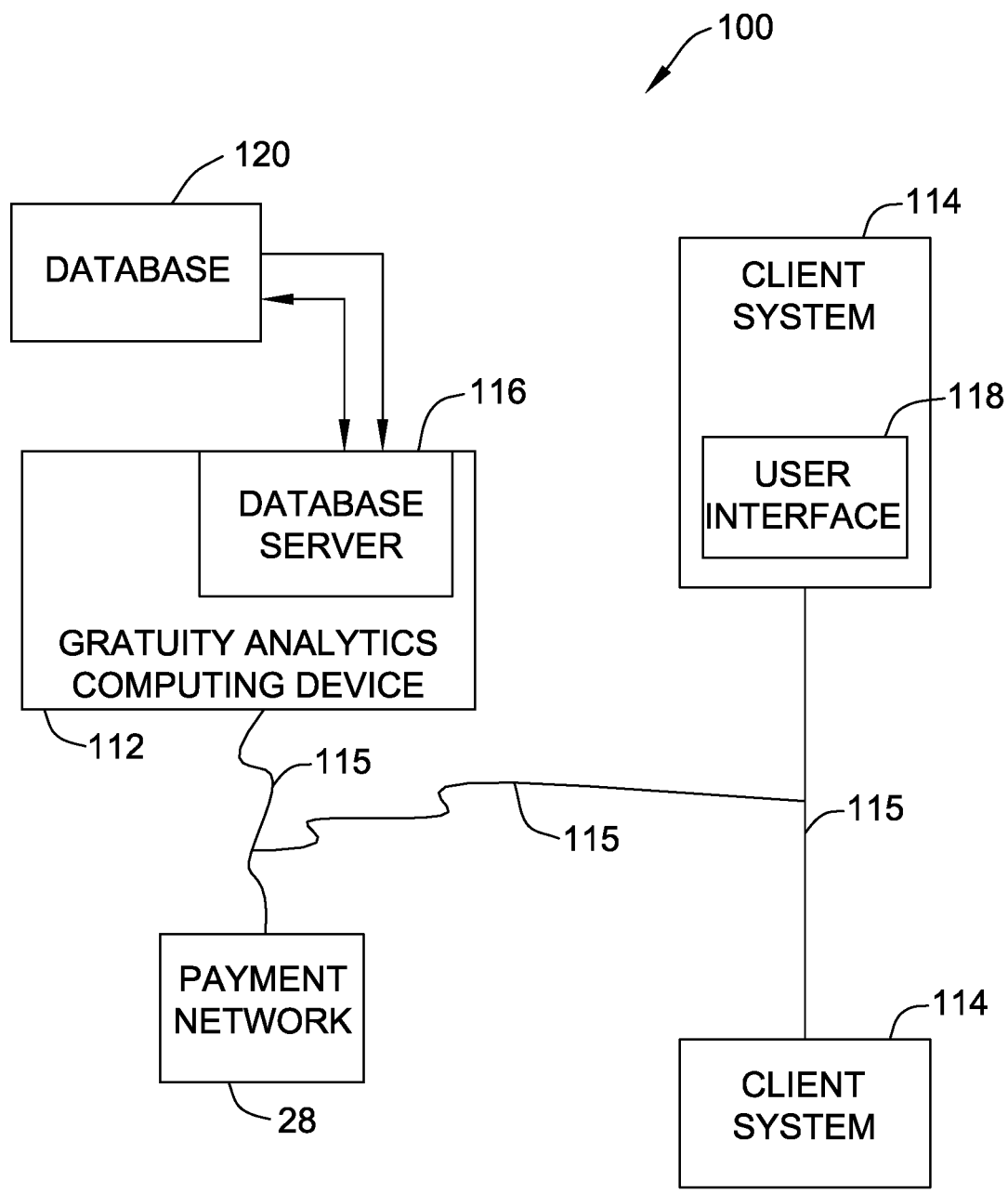

FIG. 2 is an expanded block diagram of an example embodiment of a computer system 100 used in processing payment transactions that includes gratuity analytics computing device 112 in accordance with one example embodiment of the present disclosure. In the example embodiment, system 100 is used for generating gratuity analytics and displaying the analytics on a user interface, as described herein.

More specifically, in the example embodiment, system 100 includes a gratuity analytics computing device 112, and a plurality of client sub-systems, also referred to as client systems 114, connected to gratuity analytics computing device 112. In one embodiment, client systems 114 are computers including a web browser, such that gratuity analytics computing device 112 is accessible to client systems 114 using the Internet and/or using network 115. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. Gratuity analytics computing device 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on gratuity analytics computing device 112 and can be accessed by potential users at one of client systems 114 by logging onto gratuity analytics computing device 112 through one of client systems 114. In an alternative embodiment, database 120 is stored remotely from gratuity analytics computing device 112 and may be non-centralized. Database 120 may be a database configured to store information used by gratuity analytics computing device 112 including, for example, transaction data, defined sectors, merchant definitions, user data, portfolio records, merchant scores, and sector scores.

Database 120 may include a single database having separated sections or partitions, or may include multiple databases, each being separate from each other. Database 120 may store transaction data generated over the processing network including data relating to merchants, consumers, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with one of acquirer bank 26 (shown in FIG. 1) and issuer bank 30 (also shown in FIG. 1). For example, one of client systems 114 may be a POS device. Client systems 114 may additionally or alternatively be associated with a user (e.g., a commercial real estate owner or lender, a marketing director, a consumer, or any other end user). In the example embodiment, one of client systems 114 includes a user interface 118. For example, user interface 118 may include a graphical user interface with interactive functionality, such that aggregated gratuity analytics, transmitted from gratuity analytics computing device 112 to client system 114, may be shown in a graphical format. A user of client system 114 may interact with user interface 118 to view, explore, and otherwise interact with the gratuity analytics. Gratuity analytics computing device 112 may be associated with interchange network 28 and/or may process transaction data.

Figure 3:
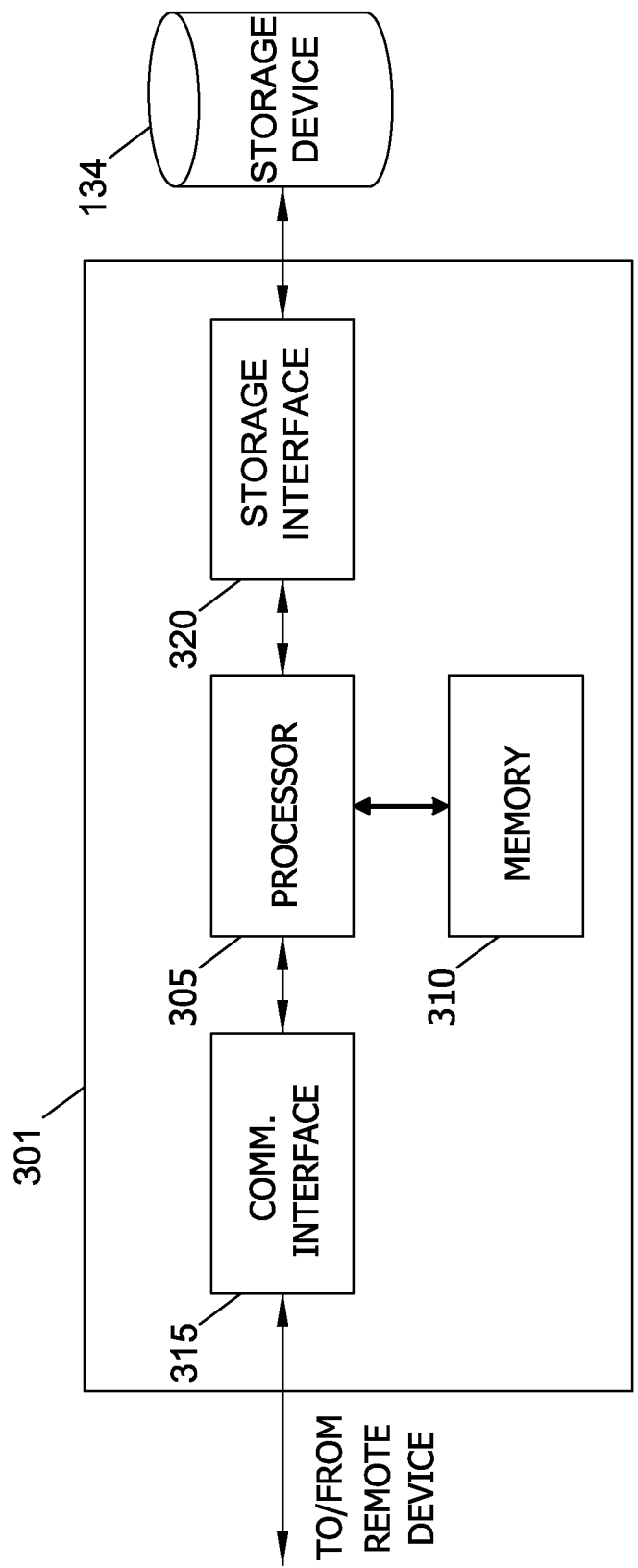

FIG. 3 illustrates an example configuration of a server system 301 such as gratuity analytics computing device 112 (shown in FIGS. 1 and 2) used to generate gratuity analytics and present said analytics on an interactive user interface, in accordance with one example embodiment of the present disclosure. Server system 301 may also include, but is not limited to, database server 116. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests (e.g., requests to display gratuity analytics and/or provide an interactive user interface) from a client system 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
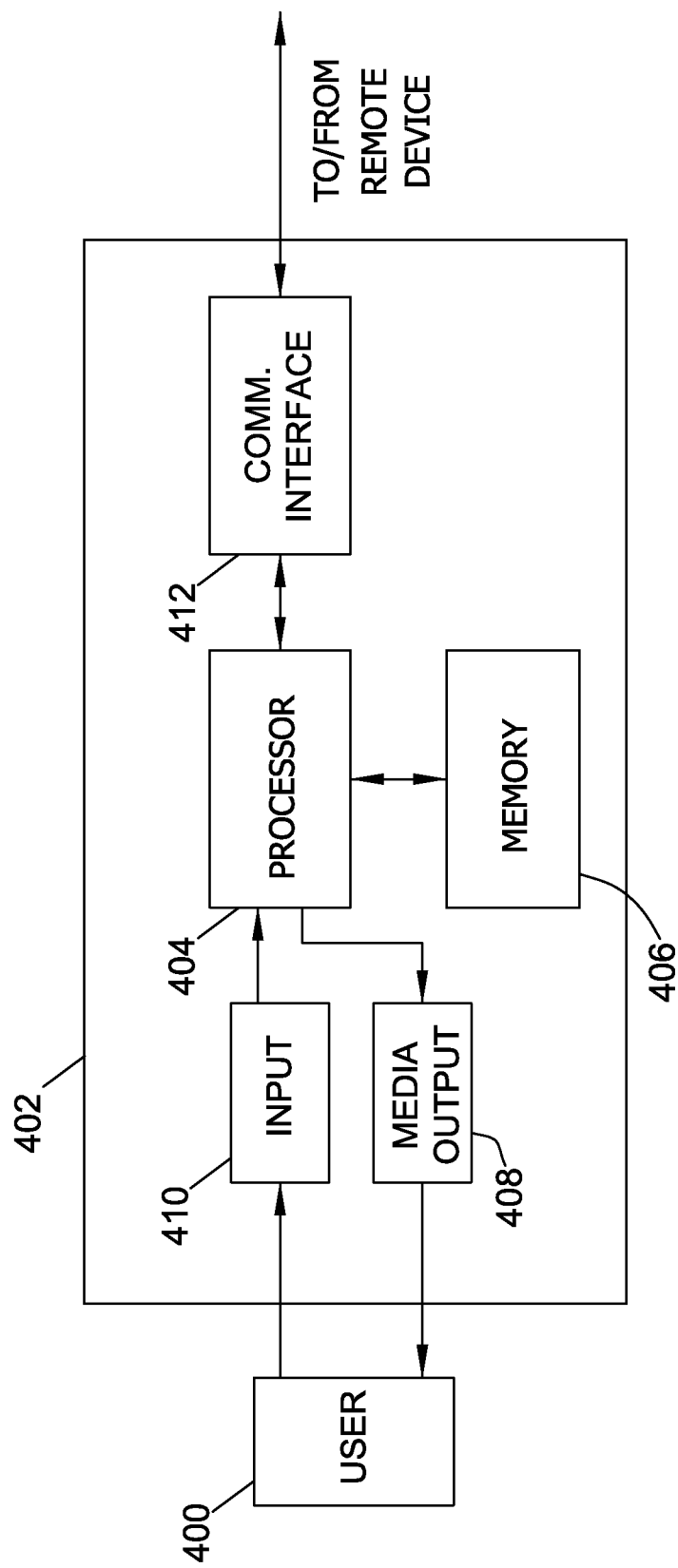

FIG. 4 illustrates an example configuration of a client computing device 402. Client computing device 402 may include, but is not limited to, client systems ("client computing devices") 114. Client computing device 402 includes a processor 404 for executing instructions. In some embodiments, executable instructions are stored in a memory area 406. Processor 404 may include one or more processing units (e.g., in a multi-core configuration). Memory area 406 is any device allowing information such as executable instructions and/or other data to be stored and retrieved. Memory area 406 may include one or more computer-readable media.

Client computing device 402 also includes at least one media output component 408 for presenting information to a user 400. Media output component 408 is any component capable of conveying information to user 400. In some embodiments, media output component 408 includes an output adapter such as a video adapter and/or an audio adapter. An output adapter is operatively coupled to processor 404 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 410 for receiving input from user 400. Input device 410 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 408 and input device 410.

Client computing device 402 may also include a communication interface 412, which is communicatively couplable to a remote device such as server system 302 or a web server operated by a merchant. Communication interface 412 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 406 are, for example, computer-readable instructions for providing a user interface to user 400 via media output component 408 and, optionally, receiving and processing input from input device 410. A user interface may include, among other possibilities, a web browser and client application. Web browsers enable users 400 to display and interact with media and other information typically embedded on a web page or a website from a web server associated with a merchant. A client application allows users 400 to interact with a server application associated with, for example, a merchant. The user interface, via one or both of a web browser and a client application, facilitates display of generated gratuity analytics by gratuity analytics computing device 112. The user may interact with the user interface to view and explore the gratuity analytics, for example, by selecting a sector of interest using input device 410 and viewing analytics associated with that sector.

Figure 5:
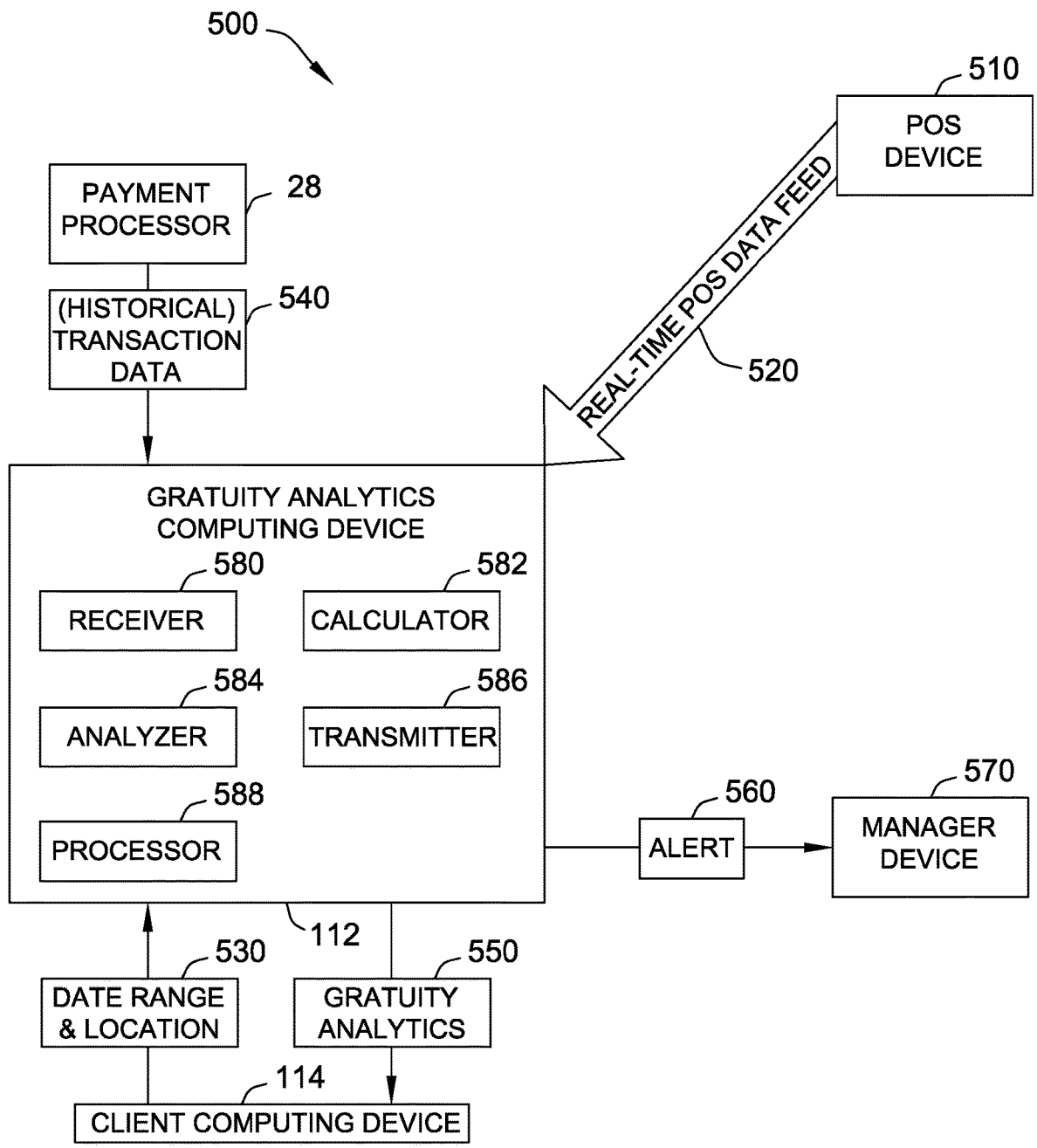

FIG. 5 is a simplified data flow diagram for generating aggregated gratuity analytics for merchants, and providing the analytics for display on a user interface using gratuity analytics computing device 112. Gratuity analytics computing device 112 includes a receiver 580, a calculator 582, an analyzer 584, a transmitter 586, and a processor 588. Although not illustrated, gratuity analyzing computing device 112 may include other components, for example, a memory, a display, an input unit, and the like. As described herein, gratuity analytics computing device 112 is in communication with POS device 510. Gratuity analytics computing device 112 receives a real-time POS data feed 520 from POS device 510. In other embodiments, gratuity analytics computing device 112 may be in communication with payment processor 28. Gratuity analytics computing device 112 receives historical transaction data 540 from payment processor 28. In some embodiments, gratuity analytics computing device 112 may be in communication with POS device 510 and payment processor 28. Gratuity analytics computing device 112 may communicate with the payment processor 28 and/or the POS device 510 through an application.

Receiver 580 may receive historical transaction data 540 and/or real-time POS data feed 520 for use in calculating and analyzing gratuity information of a plurality of cardholders who made purchases at a plurality of merchants in a plurality of locations. Merchants may include restaurants associated with the user and competitors of restaurants associated with the user. For example, receiver 580 may receive authorization data and clearing data of a plurality of transactions. The authorization data and the clearing data may be stored locally or may be stored remotely, for example, in a data warehouse of payment processor 28. In some examples, receiver 580 may receive the historical transaction data 540 and/or real-time POS data feed 520 in response to a query transmitted by transmitter 586 to a remote device such as the data warehouse. The historical transaction data 540 and/or real-time POS data feed 520 received by receiver 580 may include transactions that occur during a predetermined period of time, for example, over a week of time, a month of time, a year of time, and the like. The historical transaction data 540 and/or real-time POS data feed 520 may include a first bill amount (e.g., authorization amount), a second bill amount (e.g., clearing amount), an employee ID, a manager ID, a table ID, a merchant ID, and a time stamp.

The receiver 580 may also receive input from various users via a client computing device 114. For example, the receiver 580 may receive an input from a user via the client computing device 114 such as a desktop computer, a mobile device, a personal digital assistant (PDA), a tablet, an MP3 player, a laptop computer, and the like. The input from the user may be received via a wired connection, a wireless connection, or a combination thereof. In response to receiving a user input such as date range and location 530, the receiver 580 may store the user input in a memory (not shown) of the gratuity analyzing computing device 112. Furthermore, the user input may be used to control the analyzer 584 as is further explained herein.

Based on the received transaction data, the calculator 582 may match authorization transactions to clearing transactions, for example, based on one or more transaction identifiers included within both the authorization transactions and the clearing transactions. Calculator 582 may determine a gratuity amount for a matched transaction based on a difference in a payment amount between a clearing transaction and an authorization transaction. For example, the calculator 582 may determine a gratuity amount for all matched transactions, and store the gratuity data locally or remotely along with the historical transaction data 540 and real-time POS data feed 520.

Gratuity analytics 550 may be provided to a user via the client computing device 114, for example, based on an input of the user received by the receiver 580. For example, the receiver 580 may receive a request from the client computing device 114 for merchants within a specific location. In response, analyzer 584 may analyze the gratuity amounts generated by calculator 582 and generate tip data about merchants corresponding to the transactions who are within the specific location requested by the user. For example, analyzer 584 may determine an average tip amount for a particular merchant, a group of merchants, a location, and the like. Analyzer 584 may also determine whether a tip amount, tip percentage, and the like are currently trending upward or downward by comparing current tip data with previous tip data. As a non-limiting example, tip data of a merchant during a current month may be compared with tip data of the merchant during the same month, in a previous year, to determine whether the tip data is currently trending upward or downward.

Transmitter 586 may transmit the analyzed tip data results to client computing device 114, for example, through a wired and/or wireless connection. For example, a user may logon to a web browser controlled by a payment processor 28, an issuing bank, and the like, and receive tip data by requesting tip data through the web browser. As another example, the user may have a mobile application stored on a mobile device of the user. The payment processor 28, issuing bank, and the like, may have an application stored on a computing device thereof that supports the mobile application stored on the mobile device of the user. Accordingly, the user may request tip data through the mobile application stored on the user's mobile device.

Processor 588 may control the overall operation of gratuity analyzing computing device 112. Also, in some examples, the operation of one or more of receiver 580, calculator 582, analyzer 584, and transmitter 586 may be performed or controlled by processor 588.

Gratuity analytics computing device 112 may use real-time POS data feed 520 to determine, at analyzer 584, when a tip amount or a tip percent associated with an employee ID is outside of a threshold tip size range (e.g., if a tip for a server is outside the range of 10%-20%). In some embodiments, the threshold tip size range is determined by analyzing the historical transaction data 540. Historical transaction data 540 includes past tip sizes and ticket sizes. Past tip sizes may be used to set the threshold tip range by calculating one standard deviation from an average tip size. In some embodiments, the threshold tip size range may be determined by the manager.

Gratuity analytics computing device 112 may transmit from the transmitter 586 an alert 560 to a manager device 570 associated with a manager ID. The alert 560 is transmitted as one or more of a short message service message, an e-mail, an application notification, or any other suitable form of communication. The transmitted alert 560 indicates that the bill of an extremely dissatisfied customer or an extremely satisfied customer has been processed. This indication is based on the tip falling outside of the threshold tip size range (e.g., 10%-20% of the bill). The alert 560 communicated to the manager device 570 may include the employee ID and the table ID associated with the customer. Alert 560 may allow the manager to respond to the customer while the customer is still in the restaurant. This allows the manager to discover the source of dissatisfaction or satisfaction.

Figure 6:
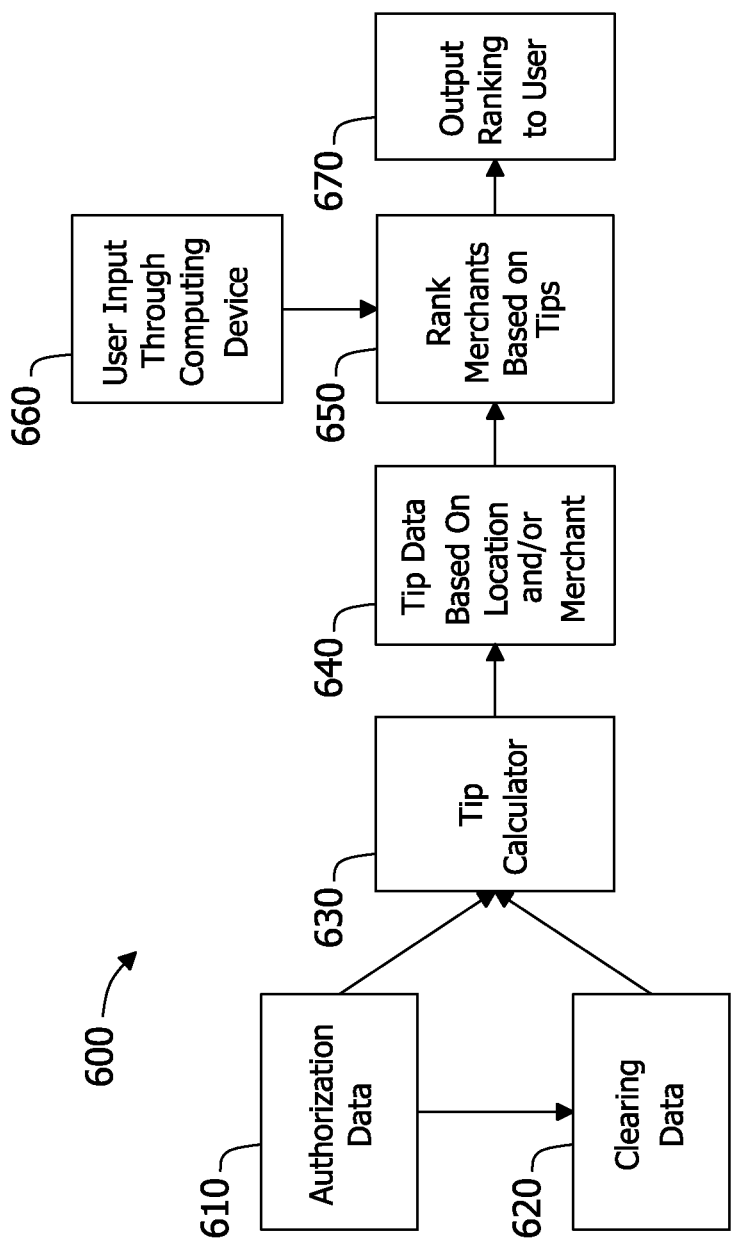

FIG. 6 is a data flow block diagram illustrating an example of a process 600 of calculating and analyzing gratuity analytics in accordance with an example embodiment of the present disclosure. Process 600 may analyze transaction data over a period of time, and determine gratuity data 640 based on the transaction data over the period of time. For example, the transaction may be a purchase made using a payment card, for example, a credit card, a debit card, a prepaid card, a charge card, a membership card, a promotional card, a frequent flyer card, an identification card, a gift card, and/or any other device that may hold payment account information, such as a mobile phone, a fob, and the like. Also, the period of time may be any desired amount of time, for example, a week, a month, a year, two years, and the like. In addition, the period of time is not necessarily the most recent period of time but may be, for example, a period of time from a previous month, a previous year, a previous two years, and the like.

In this example, authorization data 610 is generated from the authorization process of approving or declining a transaction before a purchase is finalized or cash is disbursed. For example, the authorization data 610 may be based on a purchase of items such as goods and/or services from a merchant where a tip is customary to show satisfaction with the service provided. As a non-limiting example, the items may include a round of golf, a meal at a restaurant, a cab ride, a service provided by a moving company, a barber shop, a hair salon, a cleaning service, and the like. In this example, the authorization data 610 includes one or more transaction identifiers about the transaction which may include an account number or a card number, a time and date of the transaction, a location, a merchant identification, a merchant category code, and the like. The authorization data 610 may be generated in response to an employee of the merchant entering payment information such as the payment card or payment account information of a purchaser. The authorization data 610 may be stored in a database, for example, a data warehousing system of a payment processor.

Clearing data 620 is generated from the clearing process of exchanging transaction data between a payment processor and an issuing bank (i.e., issuer). From the information provided in clearing, a payment processor may calculate the amounts for settlement. Clearing includes sending transactions from the processor to the issuer for posting to the cardholder's account (also known as "presentment"). The payment processor gathers the information, edits it, assesses the appropriate fees, and sends it on to the appropriate receiver. The clearing messages contain data but do not actually exchange or transfer funds. Like the authorization data 610, the clearing data 620 also includes one or more transaction identifiers. Also, the clearing data 620 may be stored in a database such as the data warehousing system of the payment processor.

Based on the authorization data. 610 and the clearing data 620, gratuity information may be calculated using a tip calculator 630, For example, a payment processor may query a database such as an authorization storage and a clearing storage of the data warehousing system to retrieve authorization data 610 and clearing data 620 relating to transactions carried out at one or more merchants at one or more locations in a given time period, for example during the past month, during a past year, during a previous month, during a previous year, and the like. The payment processor may match the transaction identifiers of the authorization data 610 to the transaction identifiers of the clearing data 620 to generate a table of matched identifiers. Based on the table of matched authorizations and clearings, the payment processor may determine gratuities paid by cardholders for the respective transactions, for example, based on a difference in payment amount between the clearing data 620 and the authorization data 610 of a corresponding transaction. The payment processor may determine gratuities for a number of transactions based on purchases by a number of different users. The gratuity information may be stored by the payment processor.

The payment processor may determine average gratuity analytics 640 for a specific merchant or for a group of merchants of the same type within a similar location. For example, the payment processor may calculate the gratuities left by cardholders at a particular merchant over a particular amount of time, for example, a burger restaurant over the past month. In this example, the payment processor may determine an average gratuity left by cardholders at the burger restaurant over the last month and generate analytics 640. For example, the gratuity analytics 640 may include a tip percentage, a tip amount, a current tipping trend for the business, a current tipping trend for the geographical location, a current tipping trend for the merchant ID, a current tipping trend based on the card type, and the like. The current tipping trend may be calculated by comparing historical tipping data with current tipping data and determining a trend based on the comparison.

As another example, the payment processor may group together similar types of merchants located in the same area, and determine average gratuity information for the group of merchants of the same type within the same area. For example, the payment processor may group together a plurality of burger restaurants included in a particular zip code, and calculate average gratuity data of the plurality of burger restaurants based on calculated gratuities at the burger restaurants in the particular zip code instead of calculated gratuities at an individual burger restaurant. In this example, the gratuity information from a plurality of merchants is aggregated together and may provide an average gratuity of that type of merchant in a particular location.

At 650, merchants or groups of merchants are compared with each other and a ranking is provided at 670. In this example, the ranking is determined 650 based on tips and is provided 670 to user. Rankings 650 may be based on and/or in response to an input of a user 660. Here, at 660 the user may determine whether to be provided with tip data of individual merchants or groups of merchants. For example, the user may input one or more locations, a merchant type, and or other information.

For example, at 650, individual merchants located in a similar location may be compared with each other and a ranking of the merchants based on tip data may be provided (FIG. 5) at 670. This information may be helpful to someone looking for employment in a particular area. As another example, tip data of similar merchant types at the same location may be grouped together, and tip data of groups of similar types of merchants from different locations may be compared with each other at 650 and provided to the user at 670. This information may be helpful to someone interested in opening a business of a same or similar type of business provided by the grouped merchants. As another example, tip data of similar merchant types may be helpful to the CFO, COO, and CMO to determine performance.

As described above and herein, in some embodiments, the system and/or components thereof (e.g., a payment processor or gratuity analyzing computing device, FIG. 5) may store merchant identifiers and/or associated payment amounts, gratuity amounts, base price amounts, and total amounts, and/or cardholder/account identifiers, without including sensitive personal information, also known as personally identifiable information or PII, in order to ensure the privacy of individuals and/or merchants associated with the stored data. Personally identifiable information may include any information capable of identifying an individual. For privacy and security reasons, personally identifiable information may be withheld and only secondary identifiers may be used. For example, data received by the system and/or components thereof may identify user "John Smith" as user "ZYX123" without any method of determining the actual name of user "ZYX123". In some examples where privacy and security can otherwise be ensured (e.g., via encryption and storage security), or where individuals consent, personally identifiable information may be received and used by the system. In situations in which the systems discussed herein collect personal information about individuals and/or merchants, or may make use of such personal information, the individuals and/or merchants may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Moreover, certain information about a particular merchant may be generalized or aggregated to information about an associated merchant type, to obscure merchant-level data.

Figure 7:
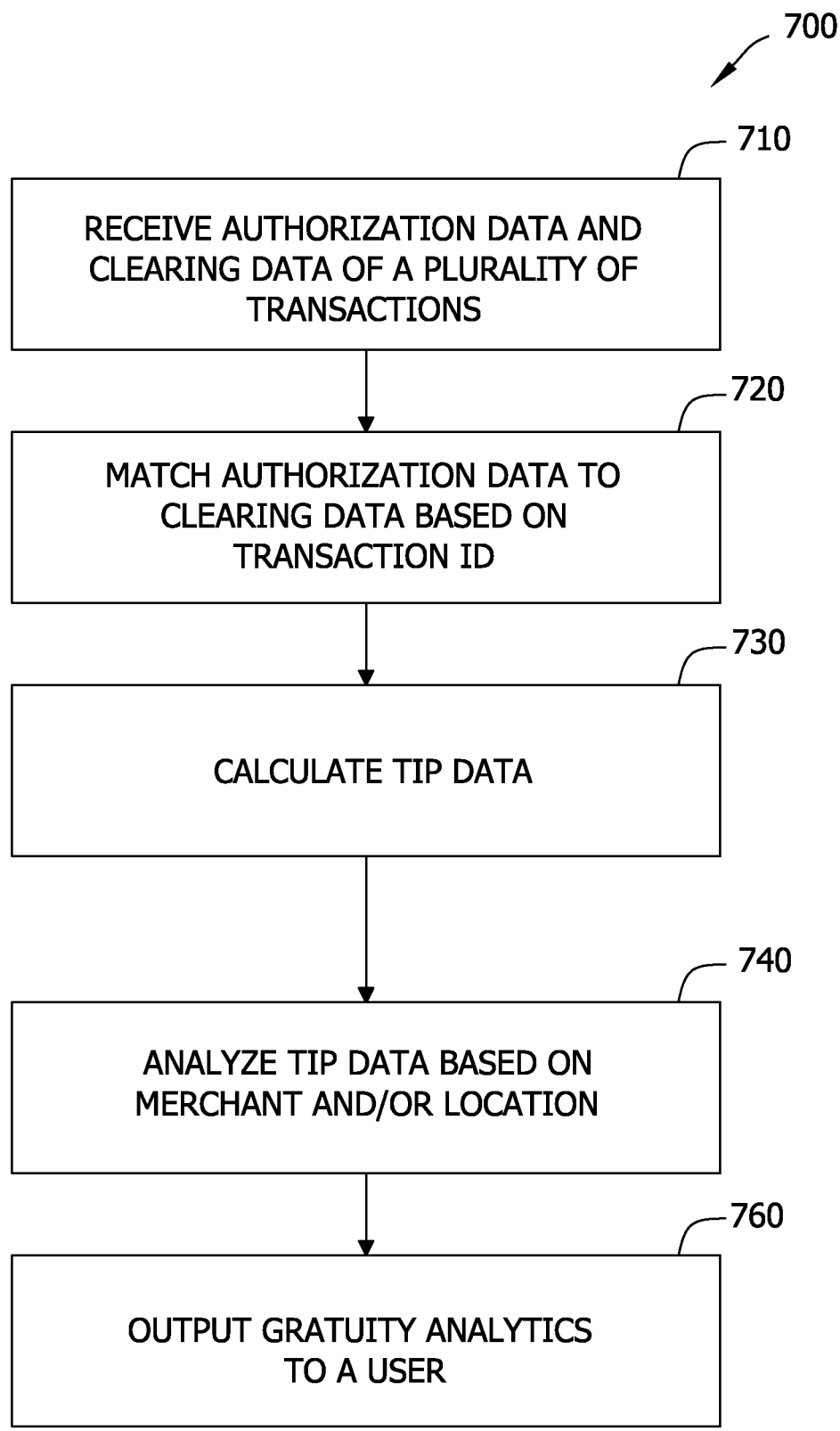

FIG. 7 is a diagram illustrating an example of a gratuity analyzing method 700 in accordance with an example embodiment of the present disclosure. Method 700 may be performed by a computing device associated with or corresponding to a payment processor. In this example, authorization data and clearing data of a plurality of transactions may be received, in 710. For example, the authorization data and the clearing data may be received automatically based on a predetermined timer, at various intervals. As another example, the authorization data and the clearing data may be received in response to a request or a query for the authorization data and the clearing data that is received from the computing device. For example, the authorization data and the clearing data may be transaction data generated during a time period that may be identified by the query transmitted by the computing device. As a non-limiting example, the time period may be the previous week, the previous month, the previous year, and the like. Also, to determine trending information, the period of time information may include a period of time that is in the past, for example, a period of time from a year ago, and the like.

Based on the authorization data and the clearing data, in 720 authorization data from a respective transaction may be matched to transaction data from the same transaction. For example, a table may be generated in which transaction identifiers included in authorization data from a plurality of transactions is respectively matched with transaction identifiers included in clearing data from the plurality of transactions. In this example, the computing device may determine that an authorization message matches a clearing message based on one or more transaction identifiers common to both the authorization message and the clearing message.

According to various examples, in 730, the method 700 may further include calculating tip data for the plurality of transactions. Based on the matched transaction data, the payment processor may determine gratuities paid by cardholders for the respective transactions, for example, based on a difference in payment amount between a total payment amount of the clearing data and a total payment amount of the authorization data of a corresponding transaction. The payment processor may determine gratuities for a plurality of transactions based on purchases by a plurality of different users. Also, the gratuity information may be stored by the payment processor.

In 740 the calculated tip data may be analyzed and a plurality of merchants may be ranked against each other based on the calculated tip data thereof. For example, in response to a user input for a particular location, tip data of a plurality of different merchants may be compared with each other, and a ranking from best to worst tip data may be generated and provided to the user. In this example, the tip data may include an average amount of tip, an average tip percentage, and/or an indication as to whether the tip percentage is trending up or down. As another example, tip data of a plurality of similar types of business in a particular location may be grouped together. For example, a type of merchant such as barbershops in the same neighborhood, zip code, city, county, and the like, may be analyzed and tip data from the barbershops may be aggregated to generate tip data for a type of business in a particular location.

The aggregation may be performed for similar types of businesses. Accordingly, tip data of a group of merchants of a first type of business may be compared with tip data of a different group of merchants of a second type of business located in the same location. As another example, different locations may be compared with each other. For example, tip data from a group of merchants of a first type of business in a first location may be aggregated. Also, tip data of a group of merchants of the first type of business but located in a second location may be aggregated. Accordingly, tip data of groups of businesses in different locations may be compared with each other. For example, tip data of a group of hair salons located in Kansas City, Mo. may be compared with tip data of a group of hair salons located in St. Louis, Mo.

The compared and ranked tip data of the merchants from one or more locations may be output to a user, in 750. For example, the ranked tip data may be displayed through a web browser on a screen of a user computer. As another example, the ranked tip data may be transmitted to a mobile device of the user through a mobile application, and the ranked tip data may be displayed on a screen of the mobile device.

Figure 8:
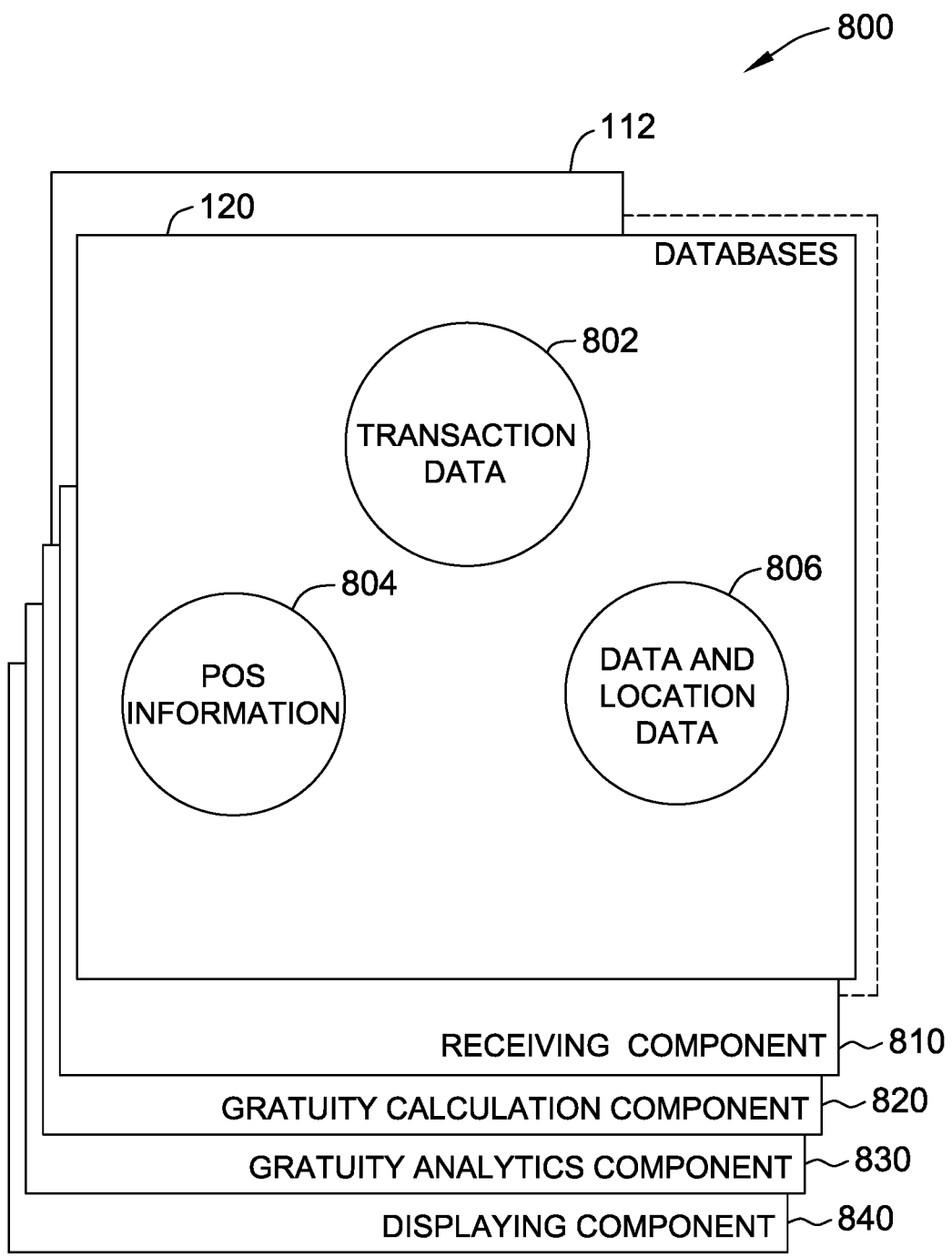

FIG. 8 is a diagram of components of one or more example computing devices that may be used in the environment shown in FIG. 2. FIG. 8 further shows a configuration of databases including at least database 120 (shown in FIG. 2). Database 120 may store information such as, for example, transaction data 802, POS Information 804, and data and location data 806. Database 120 is coupled to several separate components within gratuity analytics computing device 112, which perform specific tasks.

Gratuity analytics computing device 112 includes a receiving component 810, a gratuity calculation component 820, a gratuity analytics component 830, and a display component 840. The receiving component 810 for receives transaction data 802 for financial transactions. The financial transactions may occur in real time or within a period of time. The transaction data 802 is associated with a plurality of merchants. The gratuity calculation component 820 for using the transaction data 802, the POS information 804, and/or the data and location data 806 for calculating tip data. The gratuity analytics component 830 for analyzing the tip data. The displaying component 840 (alternatively referred to as a "display component") displays on a user interface the aggregated gratuity analytics. The aggregated gratuity analytics display is discussed further in FIGS. 9 and 10.

In some implementations, gratuity calculation component 820 (or any other component of gratuity analytics computing device 112) may be further configured to calculate a growth of a particular restaurant or a group of restaurants using received transaction data 802. The restaurants may be the same chain of restaurants, a particular type of restaurants, or restaurants within a defined location. The growth represents a difference in average tip from a beginning of the period of time to an end of the period of time. Gratuity analytics component 830 may be further configured to determine a relative ranking by comparing the growth of each merchant to the plurality of merchants and generate the growth score for each merchant based on the relative ranking.

In some implementations, gratuity calculation component 820 (or any other component of gratuity analytics computing device 112) may be further configured to calculate a stability of each merchant using received transaction data 802 for a subset of the plurality of merchants located in a predetermined area. The stability represents maintenance of average tip size during the period of time. Gratuity analytics component 830 may be further configured to determine a relative ranking for each merchant by comparing the stability of each merchant of the plurality of merchants, and generate the stability score for each merchant based on the relative ranking.

In some implementations, gratuity calculation component 820 (or any other component of gratuity analytics computing device 112) may be further configured to calculate a size of each merchant using received transaction data 802 for a subset of the plurality of merchants. The size represents a total tip size in each merchant during the period of time. Gratuity analytics component 830 may be further configured to determine a relative ranking for each merchant by comparing the size of each merchants of the plurality of merchant, and generate the size score for each merchant based on the relative ranking.

In some implementations, gratuity calculation component 820 (or any other component of gratuity analytics computing device 112) may be further configured to calculate a traffic score of each merchant using received transaction data 802 for a subset of the plurality of merchants. The traffic score represents a number of transactions initiated in each merchant during the period of time. Gratuity analytics component 820 may be further configured to determine a relative ranking for each merchant by comparing the traffic score of each merchant of the plurality of merchants, and generate the traffic score ranking for each merchant based on the relative ranking.

In some implementations, gratuity calculation component 820 (or any other component of gratuity analytics computing device 112) may be further configured to calculate an average ticket size for each merchant using received transaction data 802 for a subset of the plurality of merchants. The average ticket size represents an average transaction amount in each merchant during the period of time, and the average ticket size may be calculated by dividing a total sales revenue for a merchant by a number of transactions initiated in the merchant during the period of time. Gratuity analytics component 820 may be further configured to determine a relative ranking for each merchant by comparing the average ticket size of each merchant of the plurality of merchants, and generate the ticket size score for each merchant based on the relative ranking.

In some implementations, gratuity calculation component 820 (or any other component of gratuity analytics computing device 112) may be further configured to calculate an average tip size for each merchant using received transaction data 802 for a subset of the plurality of merchants. The average tip size represents an average amount of gratuity per transaction in each merchant during the period of time, and the average tip size may be calculated by averaging the difference between the cleared transaction amount and the authorization transaction amount for each transaction initiated in the merchant during the period of time. Gratuity analytics component 830 may be further configured to determine a relative ranking for each merchant by comparing the average tip size of each merchant of the plurality of merchants, and generate the tip size score for each merchant based on the relative ranking.

In some implementations, gratuity calculation component 820 (or any other component of gratuity analytics computing device 112) may be further configured to calculate competitor gratuity analytics using received transaction data 802, POS information 804, and/or data and location data 806 for a subset of the plurality of merchants. The competitor gratuity analytics represents the tip data collected for a restaurant's competitor (e.g., avg. tip size, avg. ticket size, etc). Gratuity analytics component 830 may be further configured to determine a relative ranking for each merchant by comparing the competitor gratuity analytics of each competitor and generate a competitor score for each merchant based on the relative ranking.

In some implementations, gratuity calculation component 820 (or any other component of gratuity analytics computing device 112) may be further configured to calculate a manager gratuity analytics using received transaction data 802, POS information 804, data and location data 806 for a subset of the plurality of merchants. The manager gratuity analytics represent the tip data collected for a manager ID. Gratuity analytics component 830 may be further configured to determine a relative ranking for each manager by comparing the manager gratuity analytics of each manager, and generate a manager score for each merchant based on the relative ranking.

In some implementations, gratuity calculation component 820 (or any other component of gratuity analytics computing device 112) may be further configured to calculate employee gratuity analytics using received transaction data 802, POS information 804, and/or data and location data 806 for a subset of the plurality of merchants. The employee gratuity analytics represents the tip data collected for an employee ID (e.g., avg. tip size, avg. ticket size, etc). Gratuity analytics component 830 may be further configured to determine a relative ranking for each employee by comparing the employee gratuity analytics of each employee, and generate an employee score for each employee based on the relative ranking.

In some implementations, gratuity calculation component 820 (or any other component of gratuity analytics computing device 112) may be further configured to calculate inter-location gratuity analytics using received transaction data 802, POS information 804, and/or data and location data 806 for a subset of the plurality of merchants. The inter-location gratuity analytics represent the tip data collected for a plurality of the locations of restaurants. Gratuity analytics component 830 may be further configured to determine a relative ranking for each location of the restaurant by comparing the gratuity analytics of each location of the restaurant, and generate a restaurant location score for each restaurant based on the relative ranking. The inter-location score ranks locations of the chain of restaurants compared to other locations. For example, it would compare restaurant locations in Missouri, Tex., and Florida for the same restaurant chain.

Gratuity analytics component 820 may be further configured to determine a relative ranking for each merchant by comparing the average tip size of each merchant of the plurality of merchants, and generate the tip size score for each merchant based on the relative ranking.

In some implementations, Gratuity calculation component 820 may be configured to generate a merchant record for each merchant of the plurality of merchants. Receiving component 810 may be configured to receive an investment goal associated with the plurality of merchants. Gratuity analytics component 840 may be configured to sort the plurality of merchant records according to the investment goal and the gratuity analytics for each sector in which each merchant of the plurality of merchants is located. Causing or displaying component 840 may be configured to present the sorted merchant records in an optimized merchant management portfolio.

Figure 9:
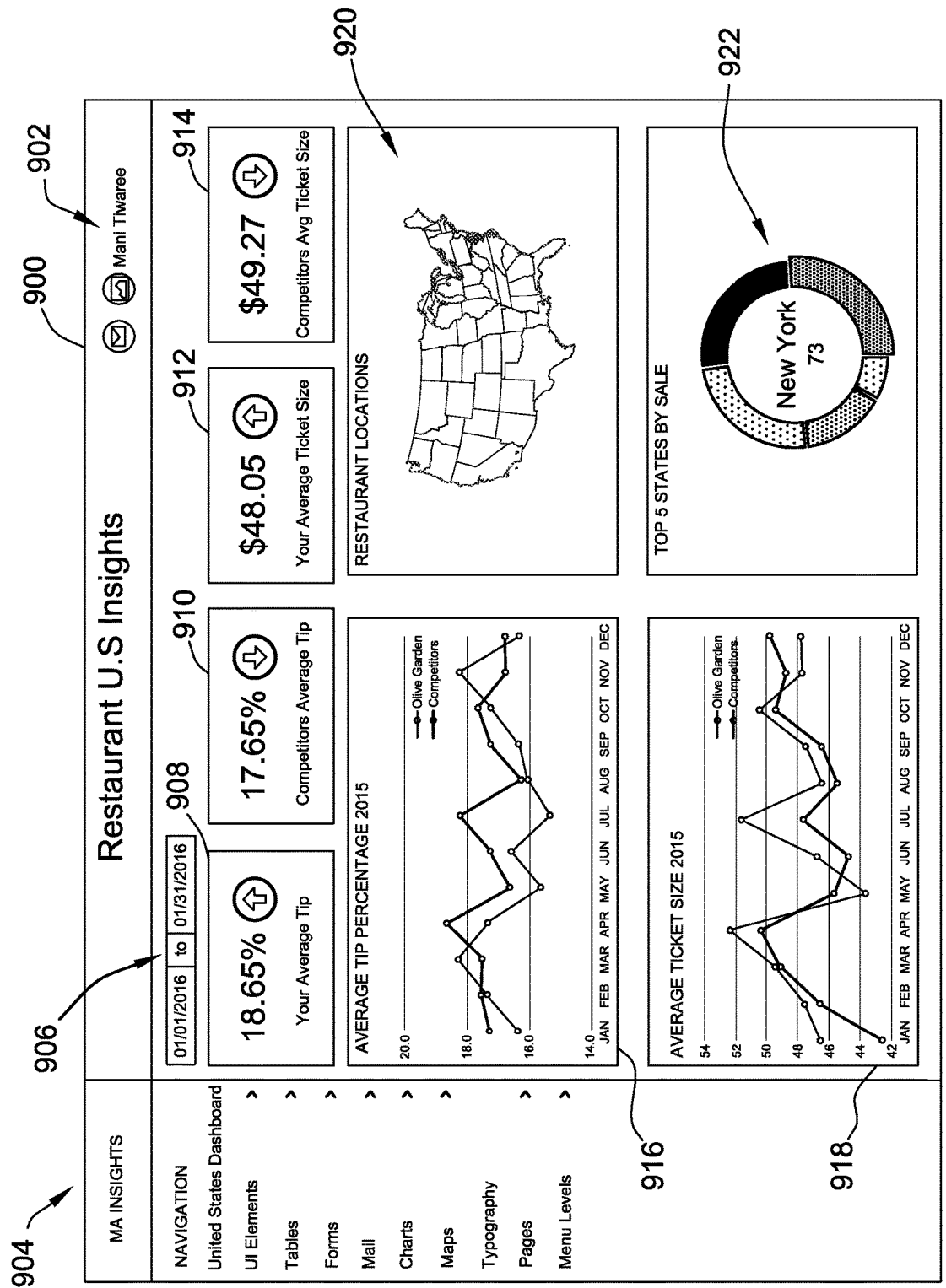
Figure 10:
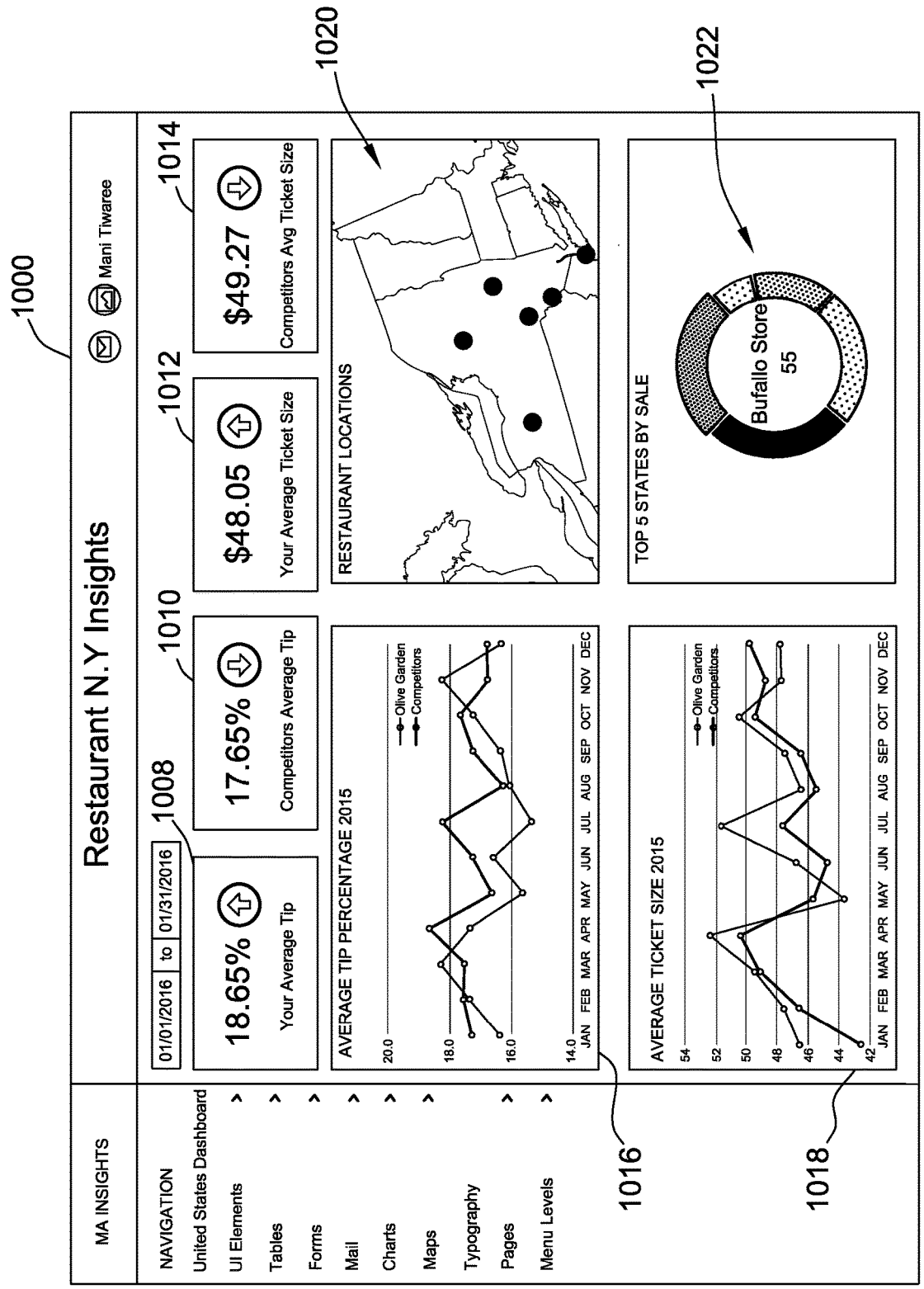

FIGS. 9 and 10 are example screenshots of a user interface of a user computing device, including gratuity analytics generated by the gratuity analytics computing device of FIG. 2. FIG. 9 is an example screenshot of a user interface of a user computing device, including gratuity analytics generated for a merchant (e.g., a restaurant chain). A national dashboard view 900 includes a user 902, a dashboard guide 904, a date range 906, a merchant average tip 908, a competitors average tip 910, a merchant average ticket size 912, a competitors average ticket size 914, an average tip percentage 916, an average ticket size percentage 918, a national restaurant overview 920, and a top states overview 922. Dashboard guide 904 allows user 902 to navigate the user interface. User 902 may select date range 906 to determine the date range for the received transactional data. This data is used to determine the national gratuity analytics for the restaurant chain. The national dashboard view 900 displays data for all restaurants of a chain nationally.

The transaction data is used to calculate the merchant average tip size 908. The merchant average tip size 908 displays the national average tip size for the merchant. A graphic (e.g., an arrow in the circle) indicates if average national tip size for the merchant has increased or decreased within the date range 906. The competitors' average tip 910 displays the national average tip size for the merchant's competitors. A graphic (e.g., an arrow in the circle) indicates if the competitors' national average tip size is increasing or decreasing. This indicates the national performance of the merchant. In this example, the merchant average tip 908 is increasing while competitors average tip 910 is decreasing indicating the merchant is improving, even while others struggle.

The merchant average ticket size 912 is the average ticket size for the restaurant nationally. The competitors' average ticket size 914 is the average ticket size for the restaurant's competitors nationally. An average ticket size is the bill amount before the tip is added. In some embodiments, the ticket size may include the tip. In some instances, the average ticket size may be used to determine which restaurants are competitors of the restaurant. Average ticket size may indicate a similarity in type of restaurant.

National dashboard view 900 includes an average tip percentage graphic 916. Average tip percentage graph 916 displays the average tip percentage of the restaurant compared to the restaurant's competitors' average tip percentage within date range 906. The average tip percentage is the average of all national tip percentages at the restaurant. A tip percentage is the percent a customer tips on a ticket (or bill). For example, a twenty dollar tip on a hundred dollar ticket is a twenty percent tip. Using a percentage allows user 902 to compare merchants even when the ticket size is not comparable. For example, when the ticket sizes are different, the average tip size at the restaurant may be lower but the average tip percentage may higher.

National dashboard view 900 includes an average ticket size graph 918. Average ticket size graph 918 compares the restaurant average ticket size to the restaurant's competitors' average ticket size. The average ticket size is the average of all national tickets within the merchant. This offers a comparison between average ticket size of the restaurant and the restaurant's competitor. If competitors are offering a similar product to the restaurant this could indicate to the user 902 that the ticket size may need to be altered. For example, if the average ticket size of competitors is $9.00 and the average ticket size of the restaurant is $15.00 this may indicate that the restaurant has priced items too high and a decrease in item prices could improve sales.

National restaurant overview 920 displays the geographical location of restaurants nationally. Top states overview 922 displays the top national locations graphically. For example, states with the highest average tip size, highest total sales, etc., are displayed graphically. In the example embodiment, the top five states are displayed (other embodiments may include a different number of top states). Top states overview 922 allows for user 902 interaction. This interaction may allow user 902 to determine the ranking of the states, to view the sales and tip data of each state, the location of the restaurants in each state and other relevant analytics.

National dashboard view 900 allows user 902 to compare the restaurant chain to the chain's competitors to determine which areas of the nation are thriving and which are failing. Further, user 902 may compare tip data to which restaurants are providing acceptable and above acceptable service and which restaurants are benefiting from a strong local economy.

FIG. 10 is an example screenshot of a user interface of a user computing device, including gratuity analytics generated for a restaurant chain. A state dashboard view 1000 includes a merchant state average tip size 1008, a competitors state average tip 1010, a merchant state average ticket size 1012, a competitors state average ticket size 1014, an average state tip percentage 1016, an average state ticket size 1018, a state restaurant overview 1020, and a city restaurant overview 1022. User 902 may select date range 906 to determine the date range for the received transactional data. This data determines state by state gratuity analytics for the restaurant chain. State dashboard view 1000 displays data for all restaurants of a chain nationally.

The transactional data determines merchant state average tip size 1008. Merchant average state tip size 1008 displays the state average tip size for the merchant. A graphic (an arrow in the circle) indicates if the average tip for the merchant has increased or decreased within date range 906. Competitors state average tip 1010 displays the state average tip size for the merchant's competitors. A graphic (an arrow in the circle) indicates if the competitors' average tip size is increasing or decreasing. This indicates performance of the merchant within the state. In this example, merchant state average tip 1008 is increasing while competitors state average tip 1010 is decreasing indicating the merchant is improving even while others struggle.

Merchant state average ticket size 1012 is the average ticket size for the restaurant within the state. Competitors state average ticket size 1014 is the average ticket size for the restaurant's competitors within the state. In some instances, the average ticket size may be used to determine which restaurants are competitors of the restaurant. Average ticket size may indicate a similarity in type of restaurant.

State dashboard view 1000 includes an average state tip percentage graph 1016. Average state tip percentage graph 1016 displays the restaurant's state average tip percentage of the restaurant compared to the restaurant's competitors' state average tip percentage within date range 906. The average tip percentage is the average of all state tip percentages at the restaurant within the state. A tip percentage is the percent a customer tips on a ticket (or bill). For example, a twenty dollar tip on a hundred dollar ticket is a twenty percent tip. Using a percentage allows user 902 to compare merchants even when the ticket size is not comparable. For example, when the ticket sizes are different the average tip size at the restaurant may be lower but the average tip percentage may higher.

State dashboard view 1000 includes an average state ticket size graph 1018. The average state ticket size graph 1018 compares the restaurant average ticket size to the restaurant's competitors' average ticket size. The average ticket size is the average of all state tickets within the merchant. This offers a comparison between average ticket size of the restaurant and the competitor. If a competitor is offering a similar product to the restaurant this could indicate to user 902 that the ticket size may need to be altered.

State restaurant overview 1020 displays the location of restaurants within the state. Top cities overview 1022 displays the top city locations within the state geographically. For example, the cities with the highest average tip size are considered top cities. User 902 may choose what determines the top cities (e.g., average tip percentage, total sales, etc.). In the example embodiment, the top five cities are displayed. This interaction may allow user 902 to determine the ranking of the states, to view the sales and tip data of each state, the location of the restaurants in each state and other relevant analytics.

State dashboard view 1000 allows user 902 to compare restaurants of a chain within a state to determine which restaurants are thriving and which are failing. State dashboard view 1000 further allows user 902 to compare the restaurant chain to the chain's competitor's within the state. This indicates to the user 902 if the restaurant chain has a high performance in comparison to chains in the market.

In one embodiment, a method for generating real-time gratuity analytics for one or more restaurants is described. The method is implemented by a gratuity analytics computing device that includes at least one processor in communication with a memory. The method includes receiving a real-time point-of-sale (POS) data feed from a POS device associated with a restaurant; receiving, as part of the POS data feed, an authorization transaction initiated by a cardholder consumer within the restaurant, the authorization transaction including a first bill amount, an employee identifier, a manager identifier, and a table identifier; receiving, as part of the POS data feed, a clearing transaction matched to the authorization transaction, the clearing transaction including a second bill amount; calculating a tip size based on the authorization transaction and the clearing transaction; comparing the tip size to a threshold tip size range; and when the tip size falls outside of the threshold tip size range, transmitting an alert to a device associated with the manager identifier.

The method further includes generating the threshold tip size range based on historical transaction data for the restaurant.

The method further includes formatting the alert and transmitting the alert as at least one of a short message service message, an e-mail, and an application notification.

The method further includes accessing the POS device using an application programming interface.

The method further includes transmitting the alert to a device associated with the manager identifier, wherein the alert includes the employee identifier and the table identifier associated with the authorization transaction.

In another embodiment, a computer-readable storage medium having computer-executable instructions embodied thereon, wherein when executed by a gratuity analytics computing device having at least one processor in communication with a memory, the computer-readable instructions cause the gratuity analytics computing device to: receive a real-time point-of-sale (POS) data feed from a POS device associated with a restaurant; receive, as part of the POS data feed, an authorization transaction initiated by a cardholder consumer within the restaurant, the authorization transaction including a first bill amount, an employee identifier, a manager identifier, and a table identifier; receive, as part of the POS data feed, a clearing transaction matched to the authorization transaction, the clearing transaction including a second bill amount; calculate a tip size using based on the authorization transaction and the clearing transaction; compare the tip size to a threshold tip size range; and when the tip size falls outside of the threshold tip size range, transmit an alert to a device associated with the manager identifier.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gratuity analytics computing device for generating real-time gratuity analytics for one or more restaurants, said gratuity analytics computing device comprising a memory in communication with a processor, said processor programmed to:

receive a real-time point-of-sale (POS) data feed from a POS device associated with a restaurant;

receive, as part of the POS data feed, an authorization message for a transaction initiated by a cardholder consumer within the restaurant, the authorization message including a first bill amount, an employee identifier, a manager identifier, and a table identifier;

receive, as part of the POS data feed, a clearing message for matching with the authorization message for the transaction, the clearing transaction including a second bill amount;

calculate a tip size based on the authorization message and the clearing message;

compare the tip size to a threshold tip size range;

when the tip size falls outside of the threshold tip size range, transmit an alert to a device associated with the manager identifier.

2. The gratuity analytics computing device of claim 1, wherein said processor is further programmed to generate the threshold tip size range based on historical transaction data for the restaurant.

3. The gratuity analytics computing device of claim 1, wherein said processor is programmed to format the alert and transmit the alert as at least one of a short message service message, an e-mail, and an application notification, wherein the alert is configured to cause the device to display the alert.

4. The gratuity analytics computing device of claim 1, wherein said processor is programmed to access the POS device using an application programming interface.

5. The gratuity analytics computing device of claim 1, wherein said processor is programmed to transmit the alert to a device associated with the manager identifier, the alert including the employee identifier and the table identifier associated with the authorization transaction.

6. A method for generating real-time gratuity analytics for one or more restaurants, said method implemented by a gratuity analytics computing device including at least one processor in communication with a memory, said method comprising:

receiving a real-time point-of-sale (POS) data feed from a POS device associated with a restaurant;

receiving, as part of the POS data feed, an authorization message for a transaction initiated by a cardholder consumer within the restaurant, the authorization message including a first bill amount, an employee identifier, a manager identifier, and a table identifier;

receiving, as part of the POS data feed, a clearing message for matching with the authorization message for the transaction, the clearing transaction including a second bill amount;

calculating a tip size based on the authorization message and the clearing message;

comparing the tip size to a threshold tip size range;

when the tip size falls outside of the threshold tip size range, transmitting an alert to a device associated with the manager identifier.

7. The method of claim 6 further comprising generating the threshold tip size range based on historical transaction data for the restaurant.

8. The method of claim 6 further comprising formatting the alert and transmitting the alert as at least one of a short message service message, an e-mail, and an application notification, wherein the alert is configured to cause the device to display the alert.

9. The method of claim 6 further comprising accessing the POS device using an application programming interface.

10. The method of claim 6 further comprising transmitting the alert to a device associated with the manager identifier, the alert including the employee identifier and the table identifier associated with the authorization transaction.

11. A computer-readable storage medium having computer-executable instructions embodied thereon, wherein when executed by a gratuity analytics computing device including at least one processor in communication with a memory, the computer-readable instructions cause the gratuity analytics computing device to:

receive a real-time point-of-sale (POS) data feed from a POS device associated with a restaurant;

receive, as part of the POS data feed, an authorization message for a transaction initiated by a cardholder consumer within the restaurant, the authorization message including a first bill amount, an employee identifier, a manager identifier, and a table identifier;

receive, as part of the POS data feed, a clearing message for matching with the authorization message for the transaction, the clearing transaction including a second bill amount;

calculate a tip size based on the authorization message and the clearing message;

compare the tip size to a threshold tip size range;

when the tip size falls outside of the threshold tip size range, transmit an alert to a device associated with the manager identifier.

12. The computer-readable storage medium of claim 11, wherein the computer-executable instructions further cause the gratuity analytics computing device to generate the threshold tip size range based on historical transaction data for the restaurant.

13. The computer-readable storage medium of claim 11, wherein the computer-executable instructions further cause the gratuity analytics computing device to format the alert and transmit the alert as at least one of a short message service message, an e-mail, and an application notification, wherein the alert is configured to cause the device to display the alert.

14. The computer-readable storage medium of claim 11, wherein the computer-executable instructions further cause the gratuity analytics computing device to access the POS device using an application programming interface.

15. The computer-readable storage medium of claim 11, wherein the computer-executable instructions further cause the gratuity analytics computing device to transmit the alert to a device associated with the manager identifier, the alert including the employee identifier and the table identifier associated with the authorization transaction.

* * * * *